United States Patent
Cho et al.

(10) Patent No.: US 10,199,174 B2
(45) Date of Patent: Feb. 5, 2019

(54) TANTALUM CAPACITOR

(71) Applicant: SAMSUNG ELECTRO-MECHANICS CO., LTD., Suwon-Si, Gyeonggi-Do (KR)

(72) Inventors: Jae Bum Cho, Suwon-Si (KR); Hong Kyu Shin, Suwon-Si (KR); Hyun Sub Oh, Suwon-Si (KR); Jeong Oh Hong, Suwon-Si (KR); Hee Sung Choi, Suwon-Si (KR); Wan Suk Yang, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 130 days.

(21) Appl. No.: 14/668,740

(22) Filed: Mar. 25, 2015

(65) Prior Publication Data
US 2016/0118189 A1 Apr. 28, 2016

(30) Foreign Application Priority Data
Oct. 22, 2014 (KR) ........................ 10-2014-0143624

(51) Int. Cl.
| | |
|---|---|
| H01G 9/00 | (2006.01) |
| H01G 9/15 | (2006.01) |
| H01G 4/236 | (2006.01) |
| H01G 4/224 | (2006.01) |
| H01G 9/012 | (2006.01) |
| H01G 9/10 | (2006.01) |
| H01G 9/14 | (2006.01) |
| H01G 9/26 | (2006.01) |

(52) U.S. Cl.
CPC ............... *H01G 9/012* (2013.01); *H01G 9/10* (2013.01); *H01G 9/14* (2013.01); *H01G 9/15* (2013.01); *H01G 9/26* (2013.01)

(58) Field of Classification Search
CPC .. H01G 9/15; H01G 2009/0014; H01G 4/236; H01G 4/224
USPC ................................. 361/538, 523, 528, 540
See application file for complete search history.

(56) References Cited

U.S. PATENT DOCUMENTS

| | | | | |
|---|---|---|---|---|
| 2006/0262486 A1* | 11/2006 | Tadanobu | ............ | H01G 9/012 361/523 |
| 2008/0080124 A1 | 4/2008 | Kim et al. | | |
| 2009/0015988 A1* | 1/2009 | Kuriyama | ............ | H01G 9/012 361/523 |
| 2009/0103243 A1* | 4/2009 | Mizukoshi | ............ | H01G 9/012 361/523 |

(Continued)

FOREIGN PATENT DOCUMENTS

| | | |
|---|---|---|
| JP | 2005-223113 A | 8/2005 |
| KR | 10-2008-0029203 A | 4/2008 |

(Continued)

*Primary Examiner* — Eric Thomas
*Assistant Examiner* — Arun Ramaswamy
(74) *Attorney, Agent, or Firm* — McDermott Will & Emery LLP

(57) ABSTRACT

There is provided a tantalum capacitor including: a tantalum capacitor body; a plurality of tantalum wires and an adhesive layer on a lower surface of the tantalum capacitor body; and a molding part enclosing the tantalum capacitor body, wherein the tantalum wire and the adhesive layer are connected to an anode lead frame and a cathode lead frame, respectively.

12 Claims, 7 Drawing Sheets

A-A'

(56) References Cited

U.S. PATENT DOCUMENTS

| | | | |
|---|---|---|---|
| 2009/0154066 A1* | 6/2009 | Choi | H01G 9/012 |
| | | | 361/523 |
| 2009/0251847 A1* | 10/2009 | Reed | H01G 4/008 |
| | | | 361/305 |
| 2010/0033904 A1* | 2/2010 | Niki | H01G 9/28 |
| | | | 361/523 |
| 2010/0142125 A1* | 6/2010 | Kim | H01G 9/012 |
| | | | 361/533 |
| 2012/0275083 A1* | 11/2012 | Yamanaka | H01G 9/012 |
| | | | 361/523 |

FOREIGN PATENT DOCUMENTS

| | | |
|---|---|---|
| KR | 10-2010-0065596 A | 6/2010 |
| WO | 2008/044483 A1 | 4/2008 |

\* cited by examiner

A-A'

B-B'

TANTALUM CAPACITOR

CROSS-REFERENCE TO RELATED APPLICATION

This application claims the priority and benefit of Korean Patent Application No. 10-2014-0143624 filed on Oct. 22, 2014, with the Korean Intellectual Property Office, the disclosure of which is incorporated herein by reference.

BACKGROUND

The present disclosure relates to a tantalum capacitor.

Tantalum (Ta) is a material widely used in various industries, such as in the aerospace and defense industries as well as in the electrical, electronic, mechanical, and chemical fields due to the advantageous mechanical and physical properties thereof, such as a high melting point, excellent flexibility and corrosion-resistance, and the like.

Since astable anodized film may be formed on tantalum, tantalum has been widely used as an anode material in small capacitors. Recently, in accordance with the rapid development of information technology (IT), particularly in fields such as electronics and information-communications, the annual usage of tantalum has rapidly increased.

Generally, a capacitor refers to a capacitor temporarily storing electricity therein and is a component in which two insulated flat plate electrodes are brought into proximity with each other, while a dielectric substance is interposed therebetween, and electrical charges are charged therein by attractive force, thereby allowing electricity to be accumulated. Such capacitors store electrical charges and electrical fields in a space enclosed by two conductors, such that capacitors are used to generate capacitance.

A tantalum capacitor using tantalum has a structure employing voids generated at the time of sintering and hardening tantalum powder and is completed by forming tantalum oxide ($Ta_2O_5$) on the surface of hardened tantalum using an anodic oxidation method, forming a manganese dioxide ($MnO_2$) layer, which is an electrolyte, on this tantalum oxide as a dielectric substance, forming a carbon layer and a metal layer on the manganese dioxide layer to form a body, forming an anode and a cathode on the body for mounting on a circuit board, and forming a molding part.

Since a tantalum capacitor according to the related art has a structure in which a board layer is formed on an electrode connection portion in order to connect a tantalum material and an electrode to each other, and a connection path such as a via hole is formed in the board layer, an internal space of a molding part is small, such that it is difficult to increase efficiency of a capacitor body or variously design the structure of an anode and a cathode.

Therefore, structures in which internal lead frames are used, or terminals are exposed externally without frames, have been disclosed.

In the case of the structure using the internal lead frames, a space occupied by the tantalum material in the molding part is decreased by the internal lead frames for an anode and a cathode, and since capacitance is in proportion to volume in the tantalum material, capacitance may be limited.

In the case of the structure in which the terminals are exposed externally without the frames, since a plurality of contact materials are present, contact resistance is increased by the plurality of contact materials, such that equivalent series resistance (ESR) and equivalent serial inductance (ESL) of the capacitor may be increased.

Further, in the case of the structure in which the terminals are exposed externally without the frames, since a cathode terminal is positioned on the side of a product, a welding distance for forming a solder should be secured between the tantalum material and the cathode lead frame, such that an internal volume ratio of the tantalum material may be decreased. Therefore, the capacitance may be decreased.

A capacitor including a tantalum element is disclosed in the following Patent Documents 1 and 2, but Patent Document 1 discloses a structure in which a tantalum wire is formed on one side of the tantalum element and connected to an anode via a reinforcing material, and Patent Document 2 discloses a structure in which a tantalum wire is led to one side of the tantalum element so as to be inclined.

RELATED ART DOCUMENT (Patent Document 1) Korean Patent Laid-Open Publication No. 2010-0065596
(Patent Document 2) Korean Patent Laid-Open Publication No. 2008-0029203

SUMMARY

An aspect of the present disclosure may provide a tantalum capacitor capable of simplifying a manufacturing process due to a simple structure without including a via hole and increasing capacitance while realizing low ESR and low ESL.

According to an aspect of the present disclosure, a tantalum capacitor may include: a tantalum capacitor body; a plurality of tantalum wires and an adhesive layer on a lower surface of the tantalum capacitor body; and a molding part enclosing the tantalum capacitor body, wherein the tantalum wire and the adhesive layer are connected to an anode lead frame and a cathode lead frame, respectively.

According to another aspect of the present disclosure, a tantalum capacitor may include: a plurality of tantalum capacitor bodies; tantalum wires and an adhesive layer on lower surfaces of the tantalum capacitor bodies; and a molding part enclosing the tantalum capacitor bodies, wherein the tantalum wires and the adhesive layer are connected to an anode lead frame and a cathode lead frame, respectively.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Further, in the present exemplary embodiment, for convenience of explanation, a direction in which an anode lead frame is disposed in a tantalum capacitor body is defined as a front direction, a direction in which a cathode lead frame is disposed in the tantalum capacitor body is defined as a back direction, directions vertically intersecting with the front and back directions are defined as both side directions, and both surfaces of the tantalum capacitor body in a thickness direction are defined as an upper surface and a lower surface (or a mounting surface).

Hereinafter, a tantalum capacitor according to an exemplary embodiment of the present disclosure will be described.

Figure 1:
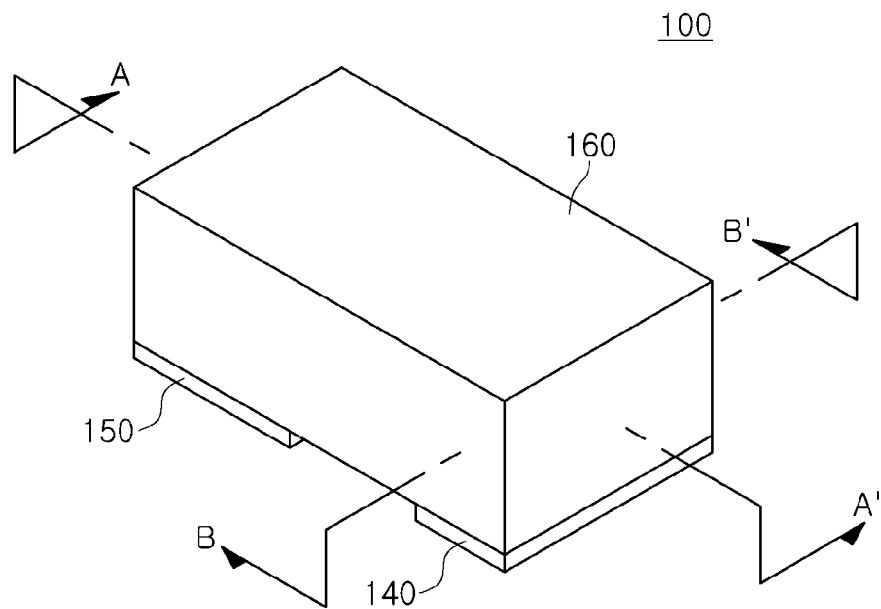
FIG. 1 is a perspective view of a tantalum capacitor according to an exemplary embodiment of the present disclosure.
Figure 2:
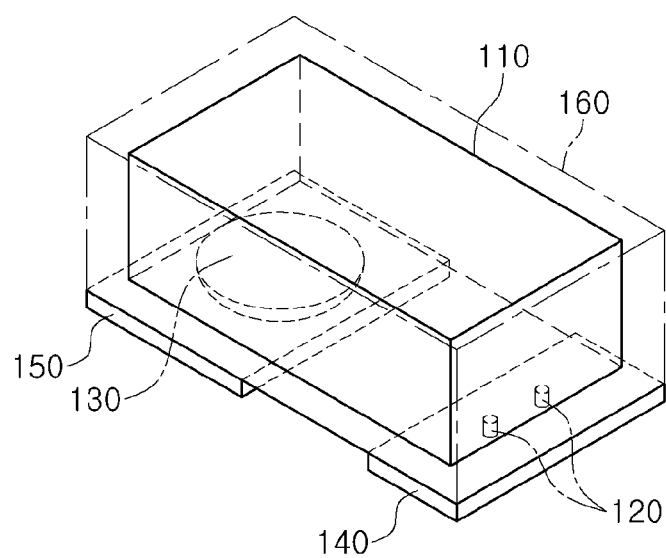
FIG. 2 is a transparent view showing a tantalum capacitor body and tantalum wires of the tantalum capacitor of FIG. 1.
Figure 3:
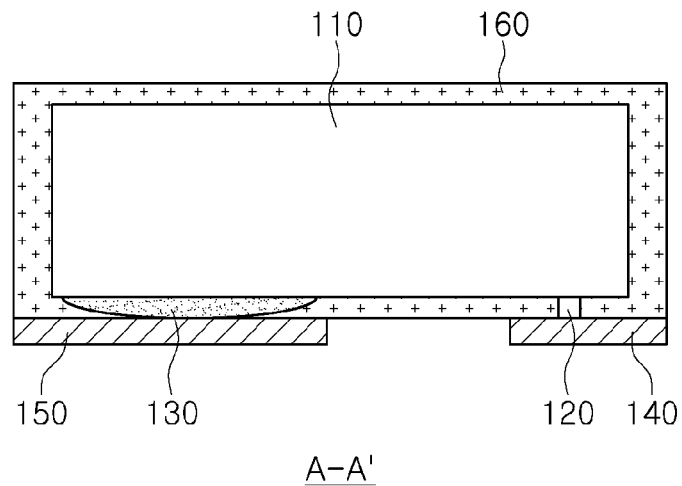
FIG. 3 is a cross-sectional view of the tantalum capacitor of FIG. 1 in an AA' direction.
Figure 4:
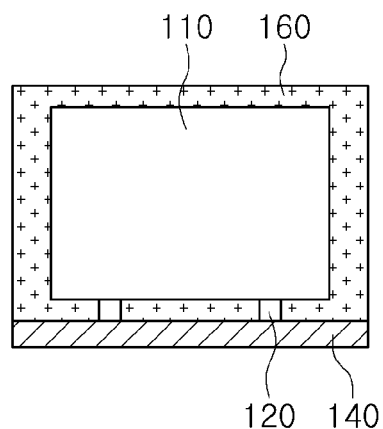
FIG. 4 is a cross-sectional view of the tantalum capacitor of FIG. 1 in a BB' direction.

FIG. 1 is a perspective view of a tantalum capacitor 100 according to an exemplary embodiment of the present disclosure, FIG. 2 is a transparent view showing a tantalum capacitor body 110 and tantalum wires 120 of the tantalum capacitor 100 of FIG. 1, FIG. 3 is a cross-sectional view of the tantalum capacitor 100 of FIG. 1 in an AA' direction; and FIG. 4 is a cross-sectional view of the tantalum capacitor 100 of FIG. 1 in a BB' direction.

Referring to FIGS. 1 through 4, the tantalum capacitor 100 according to an exemplary embodiment of the present disclosure may include: a tantalum capacitor body 110; a molding part 160 enclosing the tantalum capacitor body 110; a plurality of tantalum wires 120 disposed on a lower surface of the tantalum capacitor body 110 within the molding part 160 and exposed to one surface of the molding part 160; an adhesive layer 130 disposed on the lower surface of the tantalum capacitor body 110 within the molding part 160 and exposed to one surface of the molding part 160; an anode lead frame 140 disposed on one surface of the molding part 160 and connected to the plurality of tantalum wires 120; and a cathode lead frame 150 disposed on one surface of the molding part 160 and connected to the adhesive layer 130.

The tantalum capacitor body 110 may be formed using a tantalum material. For example, the tantalum capacitor body 110 may be manufactured by mixing and stirring tantalum powder and a binder at a predetermined ratio, compressing this mixed powder to form a rectangular parallelepiped, and then sintering the formed rectangular parallelepiped at a high temperature.

In addition, the tantalum capacitor body 110 may have the tantalum wires 120 exposed to the lower surface thereof. The tantalum wires 120 may be mounted by being inserted downwardly into a mixture of the tantalum powder and the binder so as to be eccentric toward one side before compressing the mixed powder of the tantalum powder and the binder. That is, the tantalum capacitor body 110 may be manufactured by inserting and mounting the tantalum wires 120 into the tantalum powder mixed with the binder to form a tantalum element having a desired size and then sintering the tantalum element at about 1,000 to 2,000° C. under high vacuum atmosphere ($10^{-5}$ torr or less) for about 30 minutes.

In addition, the tantalum wires 120 may be led out from the lower surface of the tantalum capacitor body 110 so as to be perpendicular to the lower surface of the tantalum capacitor body 110 in order to significantly decrease a current path, but the present disclosure is not limited thereto. If necessary, the tantalum wires 120 may be inclined at a predetermined angle with respect to the lower surface of the tantalum capacitor body 110.

The anode lead frame 140 may be formed of a conductive metal such as a nickel/iron alloy, or the like. The anode lead frame 140 may be exposed to a lower surface of the molding part 160 and used as a connection terminal for electric connection with another electronic product.

The cathode lead frame 150 may be formed of a conductive metal such as a nickel/iron alloy, or the like. The cathode lead frame 150 and the anode lead frame 140 may be disposed in parallel to each other so as to be spaced apart from each other, and a lower surface of the cathode lead frame 150 may be exposed to the lower surface of the molding part 160 to thereby be used as a connection terminal for electric connection with another electronic product.

The cathode lead frame 150 may be flat in order to secure a bonding surface with the adhesive layer 130 and the molding part 160, and the adhesive layer 130 and the tantalum capacitor body 110 may be sequentially stacked thereon, such that the cathode lead frame 150 may be electrically connected to the tantalum capacitor body 110.

In addition, the adhesive layer 130 may be formed, for example, by dispensing a predetermined amount of a conductive adhesive containing an epoxy-based thermosetting resin and conductive metal powder or by point-dotting the conductive adhesive, but the present disclosure is not limited thereto. In addition, the conductive metal powder may contain at least one of silver (Ag), gold (Au), palladium (Pd), nickel (Ni), and copper (Cu), but the present disclosure is not limited thereto.

The molding part 160 may contain an insulating material. The molding part 160 may be formed by transfer-molding a resin such as an epoxy molding compound (EMC), or the like, so as to enclose the tantalum capacitor body 110. In this case, the molding part 160 may be formed so that a portion of the adhesive layer 130 and an end portion of the tantalum wire 120 are exposed.

The molding part 160 may serve to protect the tantalum wires 120 and the tantalum capacitor body 110 from the outside and insulate the tantalum capacitor body 110 and the anode lead frame 140 from each other.

In the present exemplary embodiment, since the tantalum capacitor body 110 and the cathode lead frame 150 are directly connected to each other by the adhesive layer 130, a via hole, a printed electrode board, or the like, for connecting a tantalum capacitor body of a tantalum capacitor according to the related art and a cathode to each other are not required, such that a structure and a manufacturing process of a product may be simplified. In addition, the tantalum wires 120 may be directly connected to the anode lead frame 140 through the lower surface of the tantalum capacitor body 110 to thereby significantly decrease a length of the current path connected from an anode to a cathode, such that ESR, ESL, and the like, which are electric resistance properties of the tantalum capacitor 100, may be decreased.

Generally, as a volume of the tantalum capacitor body is increased in the structure of the tantalum capacitor, the capacitance of the capacitor may be also increased, but a physical volume is increased, such that there is a limitation in miniaturizing an element. In the present exemplary embodiment, since a solder formed between a tantalum capacitor body and a cathode lead frame according to the related art is omitted and the tantalum capacitor body and the anode lead frame are insulated from each other by an molding injection space formed on the anode lead frame, a volume ratio of the tantalum capacitor body may be maximally secured, such that the capacitance may be increased.

In an exemplary embodiment of the present disclosure, the tantalum capacitor 100 includes the plurality of tantalum wires 120, such that ESR may be significantly decreased. ESR may be defined by the following Mathematical Expression 1 (p is resistivity, L is a length, and A is a cross-sectional area).

$$ESR = \frac{\rho L}{A} \qquad \text{[Mathematical Expression 1]}$$

In the case of disposing the plurality of tantalum wires 120 in the tantalum capacitor body 110, the cross-sectional area A of the tantalum wire 120 is increased as compared to a tantalum capacitor 100 in which one tantalum wire 120 is disposed, such that ESR may be decreased.

Figure 5:
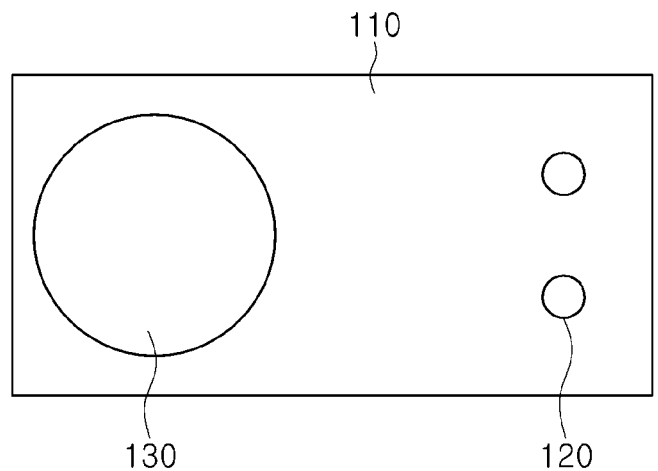
FIG. 5 is a bottom view showing the tantalum capacitor body on which an adhesive layer and the tantalum wire are disposed, in the tantalum capacitor according to an exemplary embodiment of the present disclosure.

FIG. 5 is a bottom view showing the tantalum capacitor body 110 on which the adhesive layer 130 and the tantalum wire 120 are disposed in the tantalum capacitor 100 according to an exemplary embodiment of the present disclosure.

Referring to FIG. 5, the tantalum wire 120 and the adhesive layer 130 may be disposed on the lower surface of the tantalum capacitor body 110. In this case, the adhesive layer 130 may occupy 30% to 70% of an area of the lower surface of the tantalum capacitor body 110.

The adhesive layer 130 may be connected to the cathode lead frame 150 disposed on the lower surface of the tantalum capacitor 100, and as connection areas of the adhesive layer 130 with the tantalum capacitor body 110 and the cathode lead frame 150 is increased, ESR may be decreased. Sufficiently low ESR may be obtained by allowing the adhesive layer 130 to occupy 30% or more of the area of the lower surface of the tantalum capacitor body 110. However, when the adhesive layer 130 occupies more than 70% of the area of the lower surface of the tantalum capacitor body 110, an electric short-circuit may be generated between the adhesive layer 130 and the anode lead frame 140 connected to the tantalum wire 120. Further, in the case of forming the anode lead frame 140 to be small in order to prevent the short-circuit, ESR may be rather increased. Therefore, the tantalum capacitor 100 having low ESR may be obtained by allowing the adhesive layer 130 to occupy 30% to 70% of the area of the lower surface of the tantalum capacitor body 110.

Figure 6:
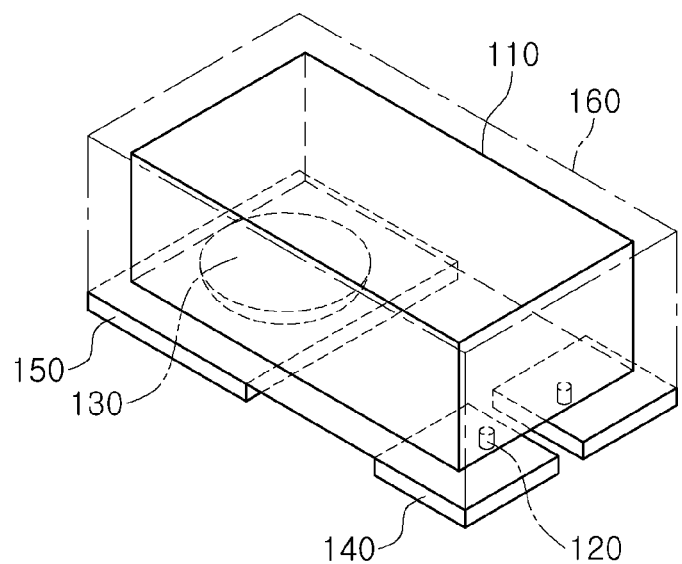
FIG. 6 is a transparent view showing the tantalum capacitor body and the tantalum wires of the tantalum capacitor according to an exemplary embodiment of the present disclosure, including separated anode lead frames.

FIG. 6 is a transparent view showing the tantalum capacitor body 110 and the tantalum wires 120 of the tantalum capacitor 100 according to an exemplary embodiment of the present disclosure, including separated anode lead frames 140.

Referring to FIG. 6, the anode lead frames 140 may include a plurality of anode lead frames and the plurality of anode lead frames may be connected to the plurality of tantalum wires 120, respectively. Since the tantalum capacitor 100 may be variously applied to electronic components through the above-mentioned disposition, a degree of freedom in design may be increased.

Figure 7:
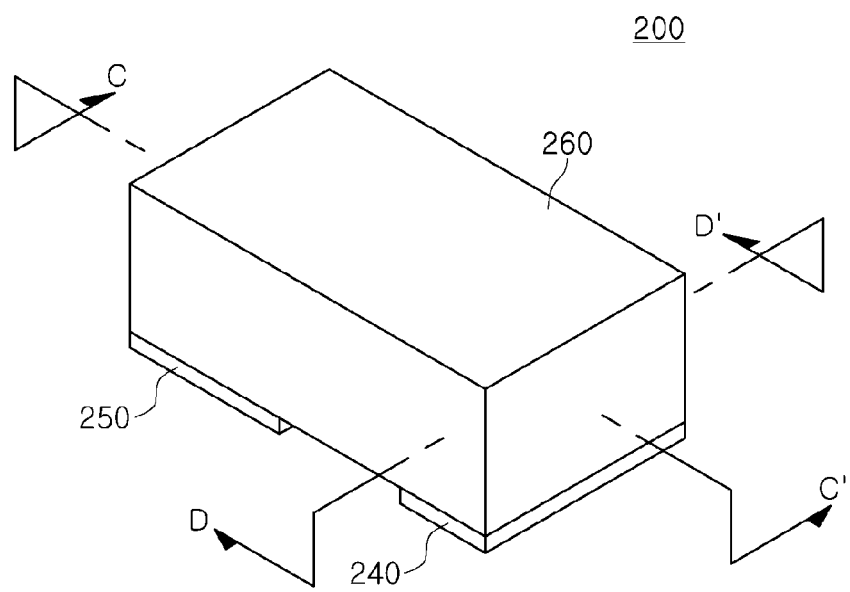
FIG. 7 is a perspective view of a tantalum capacitor according to another exemplary embodiment of the present disclosure, including a plurality of tantalum capacitor bodies.
Figure 8:
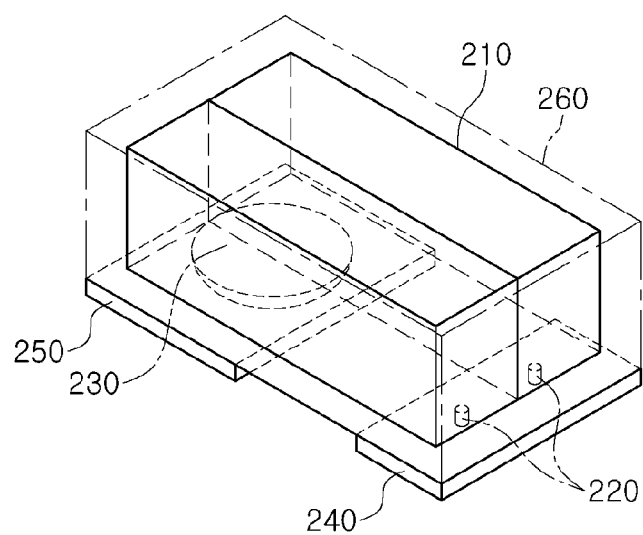
FIG. 8 is a transparent view showing the tantalum capacitor bodies and tantalum wires of the tantalum capacitor of FIG. 7.
Figure 9:
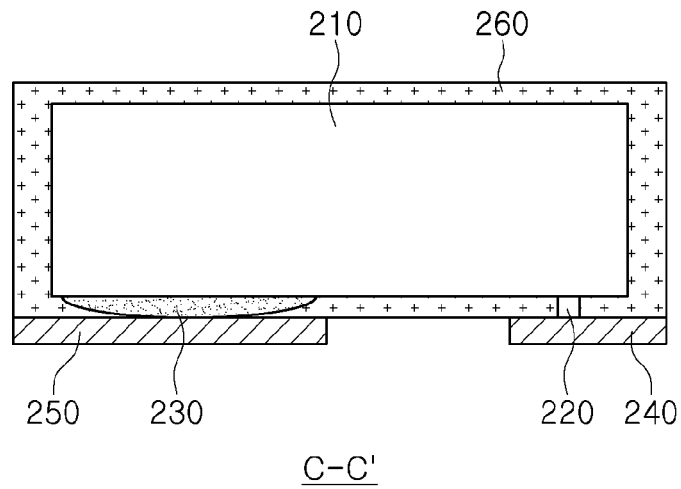
FIG. 9 is a cross-sectional view of the tantalum capacitor of FIG. 7 in a CC' direction.
Figure 10:
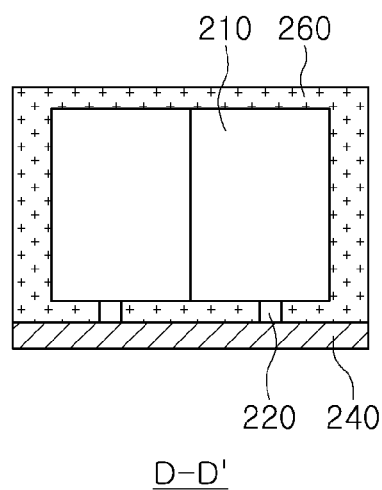
FIG. 10 is a cross-sectional view of the tantalum capacitor of FIG. 7 in a DD' direction.

FIG. 7 is a perspective view of a tantalum capacitor 200 according to another exemplary embodiment of the present disclosure, including a plurality of tantalum capacitor bodies 210, FIG. 8 is a transparent view showing the tantalum capacitor bodies 210 and tantalum wires 220 of the tantalum capacitor 200 of FIG. 7, FIG. 9 is a cross-sectional view of the tantalum capacitor 200 of FIG. 7 in a CC' direction, and FIG. 10 is a cross-sectional view of the tantalum capacitor 200 of FIG. 7 in a DD' direction.

The tantalum capacitor 200 according to another exemplary embodiment of the present disclosure may include: the plurality of tantalum capacitor bodies 210; a molding part 260 enclosing the plurality of tantalum capacitor bodies 210; tantalum wires 220 disposed on lower surfaces of the plurality of tantalum capacitor bodies 210 within the molding part 260, respectively, and exposed to one surface of the molding part 260; an adhesive layer 230 disposed on the lower surfaces of the tantalum capacitor bodies 210 within the molding part 260 and exposed to one surface of the molding part 260; an anode lead frame 240 disposed on one surface of the molding part 260 and connected to the tantalum wires 220; and a cathode lead frame 250 disposed on one surface of the molding part 260 and connected to the adhesive layer 230.

Similarly to the tantalum capacitor 100 according to an exemplary embodiment shown in FIGS. 1 through 4, in the tantalum capacitor 200 according to the present exemplary embodiment, since the tantalum capacitor body 210 and the cathode lead frame 250 are directly connected to each other by the adhesive layer 230, a via hole, a printed electrode board, and the like, for connecting a tantalum capacitor body 210 of a tantalum capacitor 200 according to the related art and a cathode to each other are not required, such that a structure and a manufacturing process of a product may be simplified. In addition, the tantalum wire 220 may be directly connected to the anode lead frame 240 through the lower surface of the tantalum capacitor body 210 to thereby significantly decrease a length of the current path connected from an anode to a cathode, such that ESR, ESL, and the like, which are electric resistance properties of the tantalum capacitor 200, may be decreased.

The plurality of tantalum capacitor bodies 210 may be disposed to be in parallel to each other so that respective side surfaces of the tantalum capacitor bodies face each other, and the plurality of tantalum capacitor bodies 210 may be connected to each other in parallel.

The plurality of tantalum capacitor bodies 210 may be connected to the cathode lead frame 250 disposed on a lower surface of the molding part 260 through the adhesive layer 230, and each of the tantalum wires 220 provided in the plurality of tantalum capacitor bodies 210 may be connected to the anode lead frame 240 disposed on the lower surface of the molding part 260. As described above, the plurality of tantalum capacitor bodies 210 may be connected to each other in parallel by one cathode lead frame 250 and one anode lead frame 240.

In the case of connecting the plurality of tantalum capacitor bodies 210 to each other in parallel, ESR may be defined as the following Mathematical Expression 2 (Rt: total ESR of the tantalum capacitor 200, R1 to Rn: ESR by each of the tantalum capacitor bodies 210 and tantalum wires 220, n: the number of tantalum capacitor bodies 210 connected to each other in parallel).

$$\frac{1}{Rt} = \frac{1}{R1} + \frac{1}{R2} + \ldots + \frac{1}{Rn}$$ [Mathematical Expression 2]

Referring to Mathematical Expression 2, in the case of connecting the plurality of tantalum capacitor bodies 210 to each other in parallel, as the number of connected tantalum capacitor bodies 210 is increased, the total ESR of the tantalum capacitor 200 may be decreased.

A material and shape of the tantalum wire 220 configuring the tantalum capacitor 200, a material of the adhesive layer 230, and materials of the anode lead frame 240 and the cathode lead frame 250 are the same as described above.

It is preferable that the tantalum wire 220 is led out from the lower surface of the tantalum capacitor body 210 so as to be perpendicular to the lower surface of the tantalum capacitor body 210 in order to significantly decrease a current path, but the present disclosure is not limited thereto. If necessary, the tantalum wire 220 may be inclined at a predetermined angle with respect to the lower surface of the tantalum capacitor body 210.

The adhesive layer 230 may be formed, for example, by dispensing a predetermined amount of a conductive adhesive containing an epoxy-based thermosetting resin and conductive metal powder or by point-dotting the conductive adhesive, wherein the conductive metal powder may contain at least one of silver (Ag), gold (Au), palladium (Pd), nickel (Ni), and copper (Cu). In addition, since the wider the connection area of the adhesive layer 230 with the tantalum capacitor body 210 and the cathode lead frame 250, the lower the ESR, the tantalum capacitor 200 having low ESR may be obtained by allowing the adhesive layer to occupy 30% to 70% of the area of the lower surfaces of the plurality of tantalum capacitor bodies 210.

Although not shown, the anode lead frame 240 may include a plurality of anode lead frames, and the plurality of anode lead frames may be connected to the plurality of tantalum capacitor bodies 210, respectively. Since the tantalum capacitor 200 may be variously applied to electronic components through the above-mentioned disposition, a degree of freedom in design may be increased.

Figure 11:
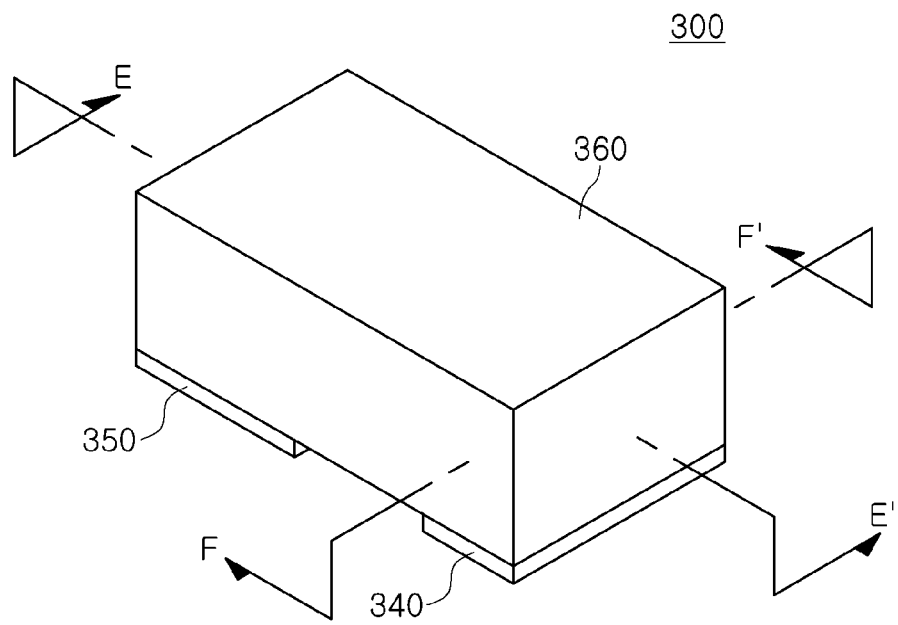
FIG. 11 is a perspective view of a tantalum capacitor according to another exemplary embodiment of the present disclosure, in which a plurality of tantalum capacitor bodies include a plurality of tantalum wires.
Figure 12:
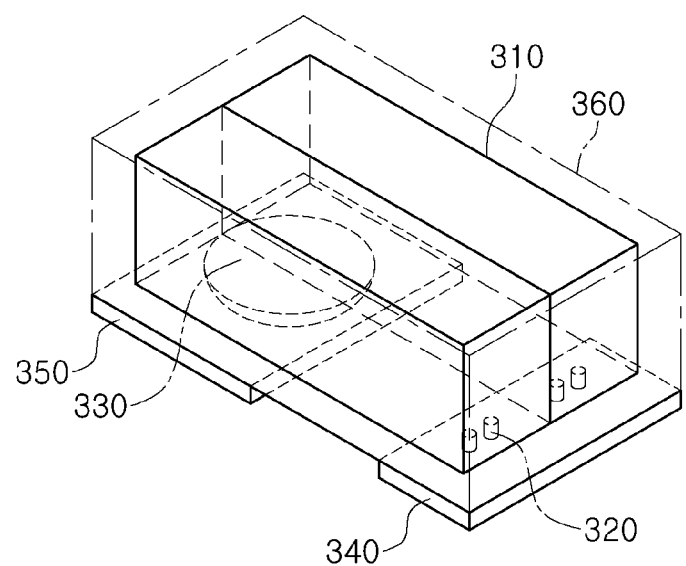
FIG. 12 is a transparent view showing the tantalum capacitor bodies and tantalum wires of the tantalum capacitor of FIG. 11.
Figure 13:
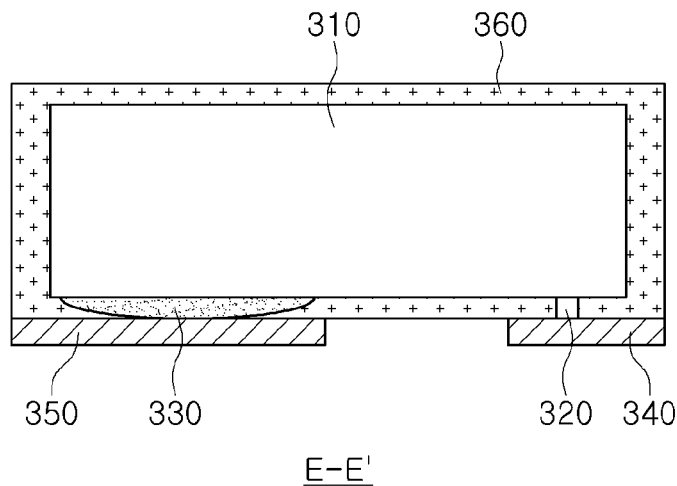
FIG. 13 is a cross-sectional view of the tantalum capacitor of FIG. 11 in an EE' direction.
Figure 14:
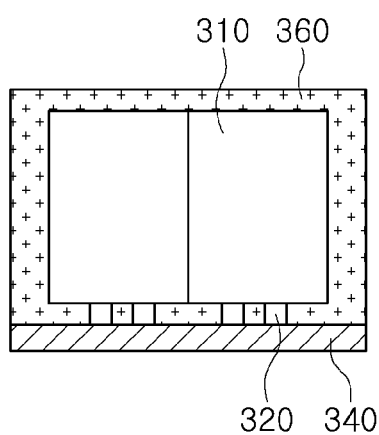
FIG. 14 is a cross-sectional view of the tantalum capacitor of FIG. 11 in an FF' direction.

FIG. 11 is a perspective view of a tantalum capacitor 300 according to another exemplary embodiment of the present disclosure, in which a plurality of tantalum capacitor bodies 310 include a plurality of tantalum wires 320, FIG. 12 is a transparent view showing the tantalum capacitor bodies 310 and tantalum wires 320 of the tantalum capacitor 300 of FIG. 11, FIG. 13 is a cross-sectional view of the tantalum capacitor 300 of FIG. 11 in an EE' direction, and FIG. 14 is a cross-sectional view of the tantalum capacitor 300 of FIG. 11 in a FF' direction.

Referring to FIGS. 11 through 14, in the tantalum capacitor 300 according to another exemplary embodiment of the present disclosure, the number of tantalum wires 320 provided in at least one of the plurality of tantalum capacitor bodies 310 is 2 or more.

As described above, in the case of disposing the plurality of tantalum wires 320 in the tantalum capacitor body 310 or connecting the plurality of tantalum capacitor bodies 310 to each other in parallel, ESR may be decreased. In the tantalum capacitor 300 shown in FIGS. 11 to 14, ESR may be decreased by disposing the plurality of tantalum wires 320 on the tantalum capacitor body 310 to increase a contact area and by connecting the plurality of tantalum capacitor bodies 310 to each other in parallel.

As set forth above, according to exemplary embodiments of the present disclosure, the tantalum capacitor may have the simple structure without including the via hole to simplify the manufacturing process and may improve capacitance while realizing low ESR and low ESL.

While exemplary embodiments have been shown and described above, it will be apparent to those skilled in the art that modifications and variations could be made without departing from the scope of the present invention as defined by the appended claims.

What is claimed is:

1. A tantalum capacitor comprising:
   a tantalum capacitor body;
   a molding part enclosing the tantalum capacitor body;
   a plurality of tantalum wires disposed on a lower surface of the tantalum capacitor body within the molding part and exposed to one surface of the molding part;
   an adhesive layer disposed on the lower surface of the tantalum capacitor body within the molding part and exposed to one surface of the molding part;
   an anode lead frame disposed on one surface of the molding part and connected to the plurality of tantalum wires; and
   a cathode lead frame disposed on one surface of the molding part and connected to the adhesive layer,
   wherein the tantalum capacitor body fills a space defined by inner surfaces of the molding part and physically contacts the inner surfaces of the molding part, and
   wherein the plurality of tantalum wires are disposed on the lower surface of the tantalum capacitor body without extending into the tantalum capacitor body.

2. The tantalum capacitor of claim 1, wherein the anode lead frame comprises a plurality of anode lead frames, and the plurality of anode lead frames are connected to the plurality of tantalum wires, respectively.

3. The tantalum capacitor of claim 1, wherein the plurality of tantalum wires are led out from the lower surface of the tantalum capacitor body so as to be perpendicular to the lower surface of the tantalum capacitor body.

4. The tantalum capacitor of claim 1, wherein the plurality of tantalum wires are led out from the lower surface of the tantalum capacitor body so as to be inclined with respect to the lower surface of the tantalum capacitor body.

5. The tantalum capacitor of claim 1, wherein the adhesive layer contains an epoxy-based thermosetting resin and conductive metal powder.

6. The tantalum capacitor of claim 5, wherein the conductive metal powder contains at least one of silver (Ag), gold (Au), palladium (Pd), nickel (Ni), and copper (Cu).

7. The tantalum capacitor of claim 1, wherein the molding part contains an insulating material.

8. The tantalum capacitor of claim 1, wherein the molding part contains an epoxy molding compound (EMC).

9. The tantalum capacitor of claim 1, wherein the adhesive layer occupies 30% to 70% of an area of the lower surface of the tantalum capacitor body.

10. The tantalum capacitor of claim 1, wherein the molding part includes a plurality of through-holes extending from one of the inner surfaces, the plurality of tantalum wires are disposed in the plurality of through-holes, respectively.

11. The tantalum capacitor of claim 1, wherein the tantalum capacitor body physically contacts at least two of the inner surfaces of the molding part.

12. The tantalum capacitor of claim 1, wherein an entire upper surface of the adhesive layer physically contacts the lower surface of the tantalum capacitor body.

* * * * *